(12) United States Patent
Yu et al.

(10) Patent No.: US 9,365,209 B2
(45) Date of Patent: Jun. 14, 2016

(54) WHEEL TORQUE DISTURBANCE SUPPRESSION

(75) Inventors: Hai Yu, Canton, MI (US); Ihab S. Soliman, Canton, MI (US); Ryan A. McGee, Ann Arbor, MI (US); Matthew A. Boesch, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 2024 days.

(21) Appl. No.: 12/473,314

(22) Filed: May 28, 2009

(65) Prior Publication Data
US 2010/0305790 A1    Dec. 2, 2010

(51) Int. Cl.
| B60T 11/00 | (2006.01) |
| G06F 19/00 | (2011.01) |
| B60W 20/00 | (2016.01) |
| B60K 6/485 | (2007.10) |
| B60W 10/06 | (2006.01) |
| B60W 10/08 | (2006.01) |
| B60W 10/11 | (2012.01) |
| B60W 10/184 | (2012.01) |

(52) U.S. Cl.
CPC ............... *B60W 20/00* (2013.01); *B60K 6/485* (2013.01); *B60W 10/06* (2013.01); *B60W 10/08* (2013.01); *B60W 10/11* (2013.01); *B60W 10/184* (2013.01); *Y02T 10/6226* (2013.01); *Y02T 10/6286* (2013.01)

(58) Field of Classification Search
USPC .............................................. 701/22; 303/191
See application file for complete search history.

(56) References Cited

U.S. PATENT DOCUMENTS

| 7,516,007 | B2 * | 4/2009 | Tamai | ..................... B60T 7/122 |
| | | | | 701/22 |
| 7,600,827 | B2 * | 10/2009 | Tamai | ..................... B60T 7/122 |
| | | | | 303/191 |

* cited by examiner

*Primary Examiner* — Adam Tissot
(74) *Attorney, Agent, or Firm* — David B. Kelley; MacMillan, Sobanski & Todd, LLC

(57) ABSTRACT

A method for controlling restart of an engine in a hybrid electric powertrain, includes engaging a gear of a transmission, releasing a brake pedal, maintaining fluid pressure at an adaptively determined magnitude in a wheel brake, initiating a restart the engine, and reducing fluid pressure in the wheel brake when the engine restarts.

19 Claims, 6 Drawing Sheets

WHEEL TORQUE DISTURBANCE SUPPRESSION

BACKGROUND OF THE INVENTION

1. Field of the Invention

This invention relates generally to a powertrain and brake system for a hybrid electric vehicle (HEV) and, more particularly, to its control during an engine restart.

2. Description of the Prior Art

A HEV is a vehicle that combines a conventional propulsion system, which includes an internal combustion engine and a transmission, a rechargeable energy storage system that includes an electric motor and electric storage battery to improve fuel economy over a conventional vehicle.

Motor vehicles can be designed to employ certain aspects of hybrid electric technology, but without use of a hybrid electric powertrain. Certain vehicles having a conventional powertrain but no electric machine for driving the wheels, called micro-HEVs, shutdown the engine at idle speed to reduce fuel consumption and reduce emissions while the vehicle is stopped.

During normal vehicle operation many instances arise where the vehicle must stop: at traffic signals, cross-walks, stop signs and the like. In micro-HEVs the engine is shut down if no power is required, e. g. while waiting at a traffic light. As soon as power is requested, the engine is automatically restarted. By avoiding an unnecessary engine idling event, the vehicle's fuel economy is improved. For this purpose, it is desirable to shut down the engine function as much as possible when certain engine stop conditions are satisfied.

An engine restart occurs while the transmission is in gear and the gear selector is in the Drive position. During an engine restart in a micro-HEV equipped with an automatic transmission and torque converter, a torque surge occurs substantially in phase with the engine startup speed peak.

During the time of engine automatic stop the intake manifold pressure has increased from the throttled vacuum of normal running condition to a higher pressure very close or equal to atmospheric pressure. At time of engine restart, this higher atmospheric pressure in the manifold leads to a very large air charge to the combustion cylinders. To achieve the emissions requirements, the proper engine out exhaust "feedgas" fed to the catalyst shall not have an abundance of either oxygen or incompletely combusted fuel by-products. In this respect, the large air charge at restart is matched by a proportionately large stoichiometric fuel injection mass, with the result being a large torque spike on the first several restart combustion events. After the manifold pressure is reduced to a throttled vacuum by nature of the mostly closed throttle and air being withdrawn by cylinders, all of the air charge, fuel injection, torque production, and engine speed decay back to usual idle conditions.

The torque spike, which is generated by the engine and amplified by the torque converter during the engine restart, is transmitted to the driven wheels if the engine is restarted with the transmission in-gear. The torque spike produces a forward acceleration pulse. Such an uncomfortable vehicle jerk adversely affects the driver's acceptance to the stop/start function.

A need exists for a technique that suppresses the torque surge during an engine restart event in a micro-HEV powertrain.

SUMMARY OF THE INVENTION

A method for controlling restart of an engine in a hybrid electric powertrain, includes engaging a gear of a transmission, releasing a brake pedal, maintaining fluid pressure in a wheel brake, initiating an engine restart, and reducing fluid pressure in the wheel brake when the engine restarts.

A system for controlling the restart in a hybrid electric powertrain, includes a transmission engaged in a gear, a brake pedal, and a controller configured to maintain fluid pressure at a adaptively determined magnitude in a wheel brake, to initiate an engine restart after the brake pedal is released, and to reduce fluid pressure in the wheel brake when the engine restarts.

The Wheel Torque Disturbance Suppression (WTDS) control requires no new device or hardware modification or improvement, and can be realized with an existing vehicle brake system with only software development. The WTDS control does not consume additional energy; it uses the brake line pressure input by the vehicle driver or by any active brake function to achieve restart assistance to the engine stop/start process and for powertrain torque disturbance suppression.

The powertrain torque oscillation and jerk are not transmitted to the vehicle wheels thereby providing a smooth vehicle drive-off process. The brake based technology is simpler in control complexity and control actuation method than engine based or transmission based control methods, and the resulting controlled performance is more consistent and robust.

Brake line pressure provides brake reaction torque that is able to hold the wheel from any motion caused by engine torque or other disturbance torque acting on the vehicle at standstill. The brake action isolates the unexpected powertrain disturbance torque from the vehicle. As the brake pressure ramps down and the powertrain torque increases, vehicle creep or drive-off are performed in response to the driver's manual control of the accelerator pedal.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
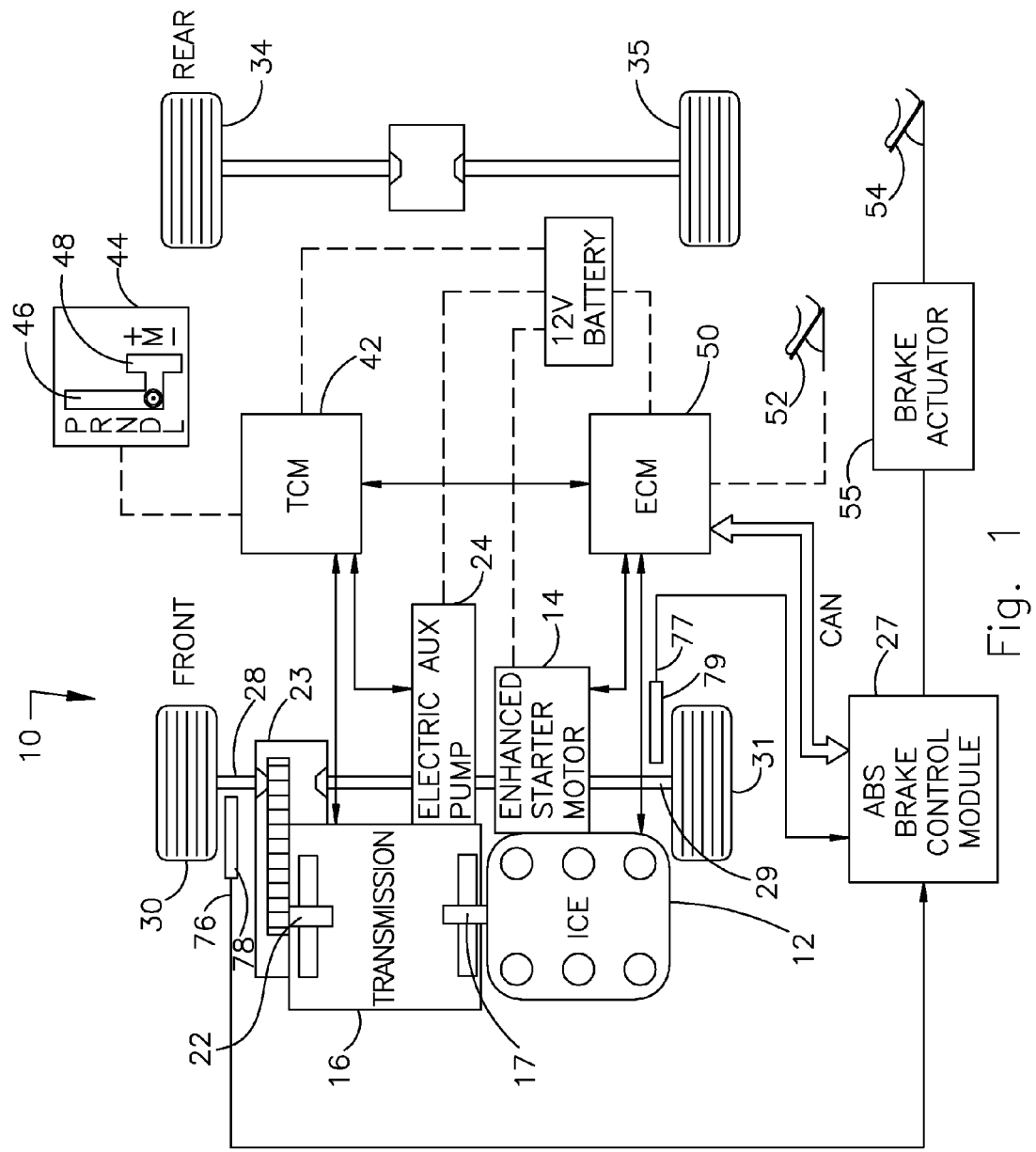
FIG. 1 is a schematic diagram of a micro-HEV powertrain.

Referring now to the drawings, the micro-HEV powertrain 10 of FIG. 1 includes a power source 12, such as an internal combustion engine; an enhanced engine starter motor 14; an automatic transmission 16, whose input shaft 17 is connected through a torque converter to the engine; a transmission output 22; final drive mechanism 23 connected to the output 22; an electric auxiliary hydraulic pump (EAUX) 24, whose output pressurizes the hydraulic system of the transmission; an electric storage battery 26, which supplies electric power to the pump 24, ABS module 27; and axle shafts 28, 29, driveably connect to the driven wheels 30, 31.

A transmission control module (TCM) 42 receives and sends signals to the pump 24 and transmission 16 and receives input signals from the battery 26 and a gear shifter 44, which moves among P, R, N, D, L positions in an automatic mode channel 46 and between upshift (+) and downshift (−) positions in a manual mode channel 48. An engine control module (ECM) 50, which communicates through a CAN with a brake control module 27, receives and sends signals to the starter 14 and engine 12 and receives input signals from the battery 26 and an accelerator pedal 52. Signals representing movement of brake pedal 54 are transmitted through a brake actuator 55 to the brake control module 27, which controls fluid pressure in brake lines 76, 77 and wheel brakes 78, 79.

While the micro-HEV is stopped, at least one wheel brake maintains brake force on at least one of the wheels 30, 31 on the driven axles 28, 29 and the non-driven wheels 34, 35. After the vehicle operator releases the service brake, wheel torque disturbance suppression (WTDS) control maintains brake pressure in the brake system at a magnitude necessary for powertrain disturbance torque suppression. WTDS control releases the brake line pressure in coordination with the engine torque output once engine speed reaches and passes a predetermined speed.

The brake release is activated when an engine started flag is set, which is determined when either (i) a certain engine speed reference speed has occurred and the engine restart speed peak has been detected, or (ii) a certain high engine speed threshold has been passed for a certain calibration period and a certain level of calibrated engine speed gradient occurs.

In addition to normal brake pressure release conditions, brake pressure is released when (i) the brake pedal is reapplied, or (ii) the accelerator pedal is displaced, or (iii) the WTDS timer expires.

WTDS only functions during engine restart during a predetermined period measured by a WTDS timer. If the engine does not restart properly, WTDS remains disabled after a WTDS timer expires. During the engine restart event, the brake force is neither reduced too early, in which case more powertrain torque surge is transmitted to the driven wheels, nor too late, in which case loss of drivability and degraded performance will result as the brakes drag and prevent the vehicle accelerating from the stop. When the engine stalls and engine restart is attempted, WTDS will extend its timer and wait for the engine to restart. If the engine is down without trying to restart, or if the engine fails attempting to restart, WTDS will give up and exit after its timer expires without further extension.

Figure 2:
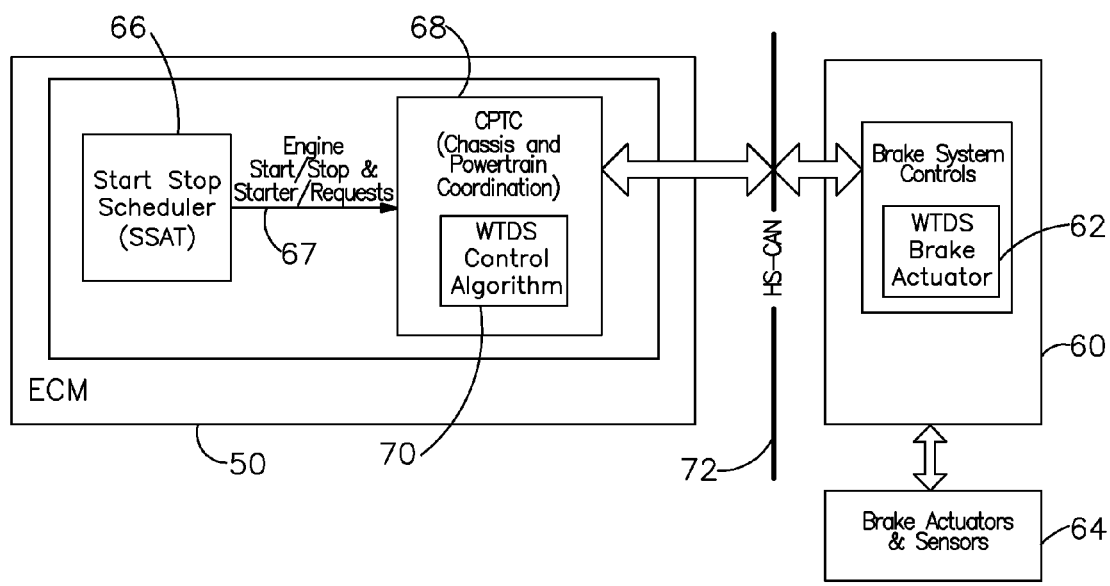
FIG. 2 is schematic diagram showing a portion of the WTDS control system.

FIG. 2 illustrates schematically a portion of a WTDS control system. WTDS control is preferably entered when the micro-HEV is at standstill, engine 16 is stopped, accelerator pedal 52 is released, brake pedal 54 is applied, the park brake is released, the PRNDL gear selector 44 is in Drive range or Low range, and WTDS control is enabled.

The brake system controls 60, which include a WTDS brake actuator 62, receive input signals from and transmit commands to brake actuators and sensors 64. The ECM 50 includes a start-stop scheduler (SSAT) 66, which transmits engine start/stop requests and requests to activate starter 14 to a chassis and powertrain coordinator (CPTC) 68, which may incorporated the TCM 42 and contains a WTDS algorithm 70. The final WTDS brake pressure/torque level is adaptively determined in CPTC based on engine and transmission control states and efforts as well as the brake states. The brake system controls 62 and CPTC 68 communicate through a high speed communications area network (HS-CAN) 72.

When the driver releases brake pedal 54 in preparation to accelerate the vehicle, pressure in the brake lines 76, 77 connected to wheel brakes 78, 79 is automatically maintained if the master cylinder pressure P_MC drops to a CPTC adaptively determined magnitude P_WTDS. Such a pressure level will enable the service brakes 78, 79 to suppress the worse case torque spike produced by the powertrain. In general, P_WTDS can be determined empirically based on the powertrain configuration, or it can be adaptively calculated with reference to additional driveline and vehicle information, such as the gear ratio in which the vehicle will be accelerated, engine restart strategy, service brake condition, vehicle inertia, powertrain inertia, tolerance factor, etc.

Figure 3A:
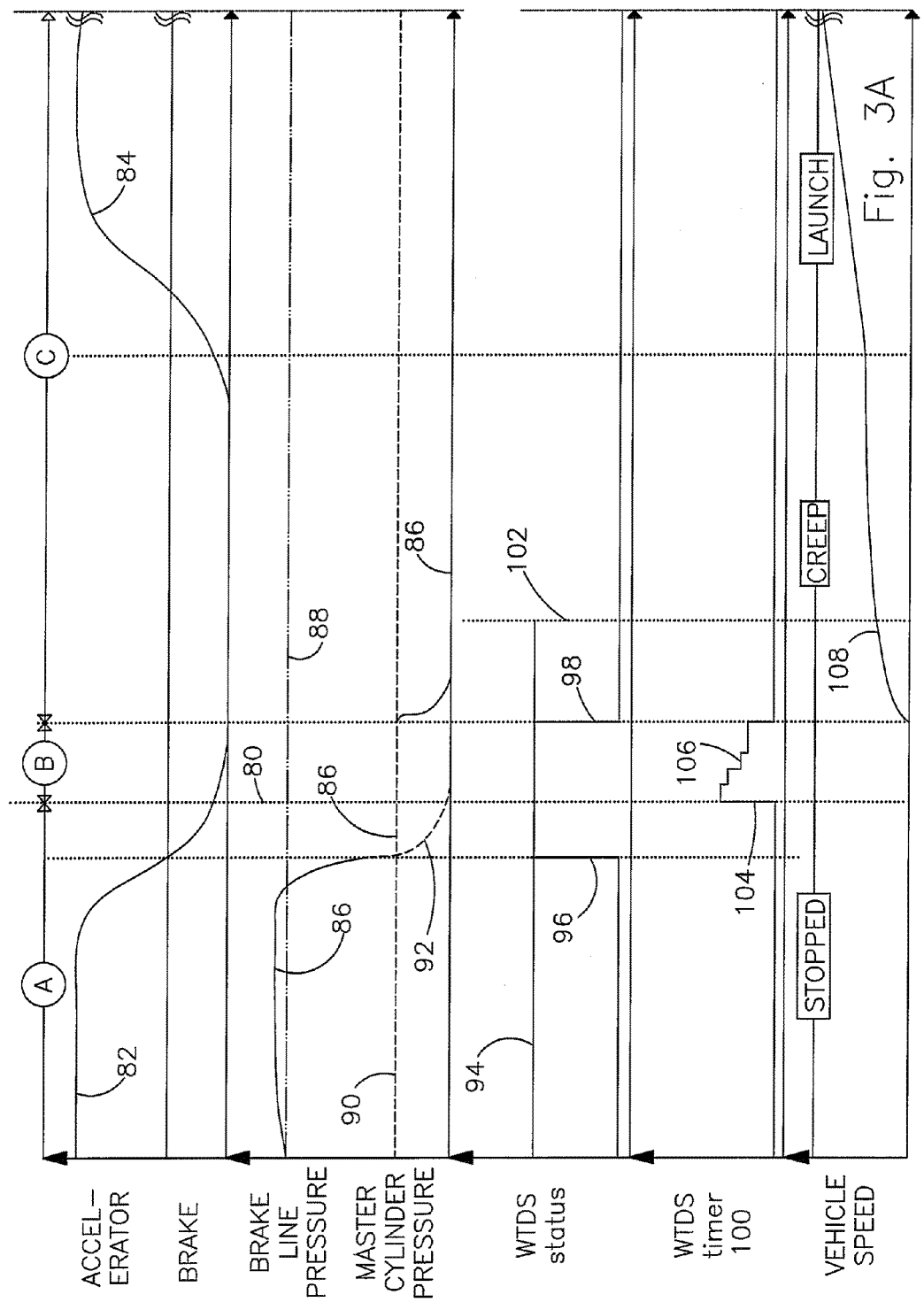
FIGS. 3A and 3B are graphs that illustrate the change of certain powertrain variables during a Drive-Reverse shifter engagement and the control of an engine restart.
Figure 3B:
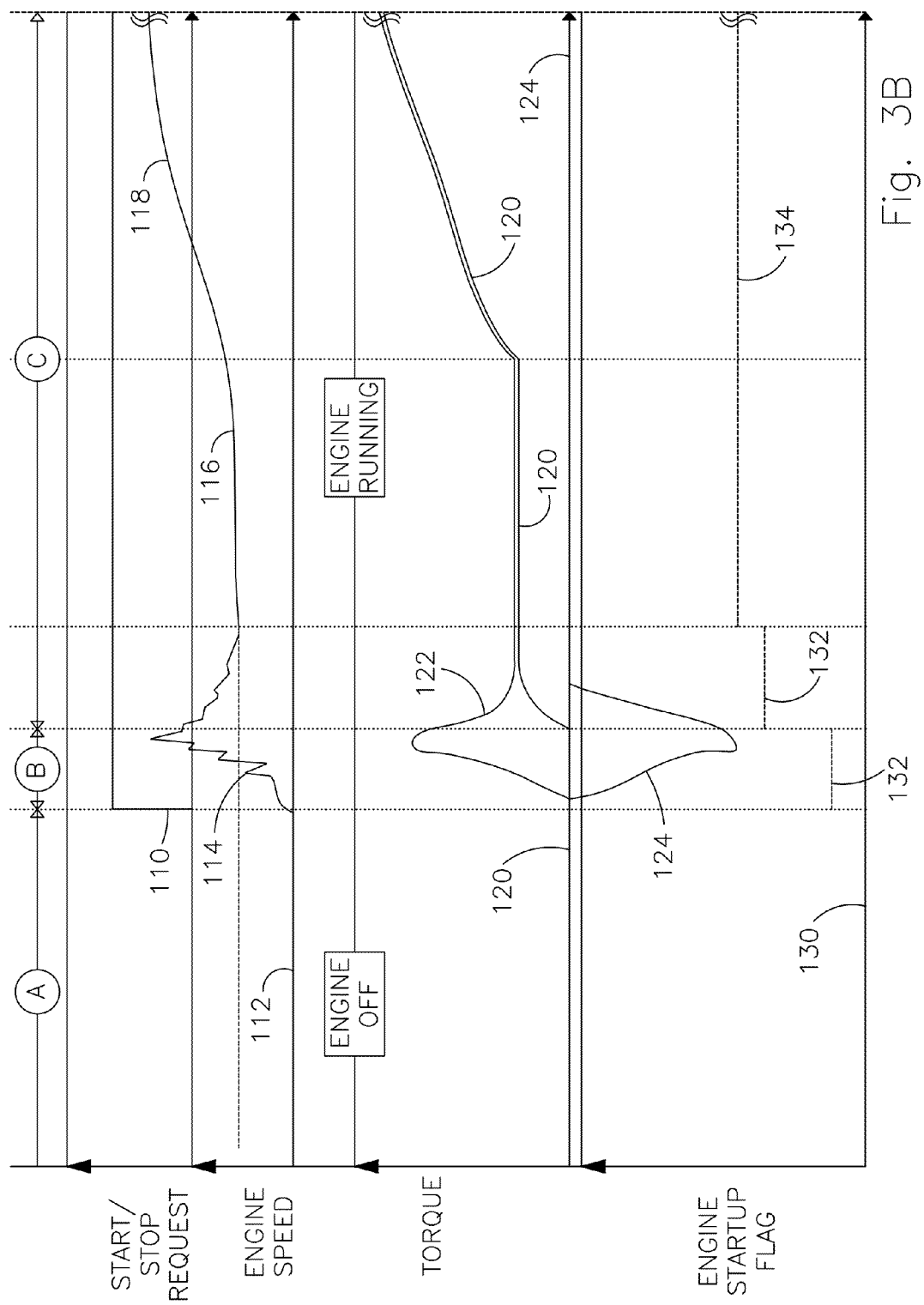

FIG. 3 contains graphs showing the change of certain powertrain variables during WTDS control of an engine restart. During period A, the vehicle is stopped and the engine is initially stopped before the engine restart is initiated at 80 by a restart request. During period B, engine combustion occurs and becomes sustained. During period C, the vehicle creeps ahead and launches as vehicle speed increases.

Graph 82 represents the application and gradual release of the brake pedal 54 while vehicle is stopped. Graph 84 represents the application of the accelerator pedal 52.

Graph 86 represents pressure in brake lines 76, 77. The brake pressure can be held above the brake line. It can also be held at individual brake chamber/caliper level at each wheel. Line 88 represents the sufficiently high brake pressure level.

Line 90 represents the adaptively determined brake pressure level P_WTDS, which is a combination of a predetermined brake pressure plus an adaptive brake pressure correction that accounts for the powertrain states, predicted residual powertrain wheel torque, road gradient load torque compensation, and tolerance compensation Graph 92 represents the master cylinder pressure P_MC. WTDS control is disabled if no engine stop has occurred, or transmission 16 is not in gear during the engine restart event.

Graph 94 shows that WTDS control is enabled after engine 12 is stopped and the transmission 16 is in gear. Graph 96 represents active WTDS control after release of the brake pedal 54 and brake system pressure decreasing to the reference pressure P_WTDS. Graph 98 represents active WTDS control becoming inactive after engine 12 restarts or the WTDS timer 100 expires. Graph 102 shows that WTDS control is disabled by setting an engine-running flag.

The method releases fluid pressure in the wheel brake to allow the engine to accelerate the vehicle in response to depressing accelerator pedal 52. A technique for producing this result is illustrated in graph 104, which shows resetting the WTDS timer 100 for about 500 ms when a request to restart the engine 12 occurs at 80. The countdown 106 of timer 100 occurs after its resetting. Brake system pressure 86 decreases immediately after the engine restart is initiated at 80, regardless of whether the timer 100 has expired. If timer 100 expires before the engine restarts, brake system pressure 86 decreases immediately.

Graph 108 represents vehicle speed increasing from zero after sustained engine combustion occurs at 98.

Graph 110 represents an engine restart request 67 from SSAT 66 as the brake pedal 54 is released and the gear shifter 44 is in the DRIVE range or LOW range.

Graph 112, which represents engine speed, shows an increase in engine speed beginning at the start of the engine restart 80 when the starter 14 cranks the engine 12. Engine speed continues to increase following the first engine combustion 114, remains relatively steady at idle speed 116 during the period while engine combustion is sustained, and increases further 118 as engine torque increases.

Graph 120 represents wheel torque $T_{WHL}$, which is the sum of engine crankshaft torque at the wheels 30, 31 in the current gear $T_{CRANK\_WHL}$, brake torque $T_{BRK}$ and road load at the wheels $T_{RL}$, which remains zero, in this example, during the restart event. Graph 122 represents crankshaft torque at the wheels 30, 31 in the current gear $T_{CRANK\_WHL}$. Graph 124 represents brake torque $T_{BRK}$. During period B, the positive torque spike of engine crankshaft torque at the wheels 30, 31 $T_{CRANK\_WHL}$ is suppressed by the negative brake torque $T_{BRK}$, and wheel torque $T_{WHL}$ is substantially constant. Following period B, wheel torque $T_{WHL}$ is delayed for at most 300-500 ms following the restart request 110, depending on how quickly engine 12 can be restarted.

An engine restart flag varies among stopped 130, starting 132, engine speed peak passed, and engine running 134.

Figure 4A:
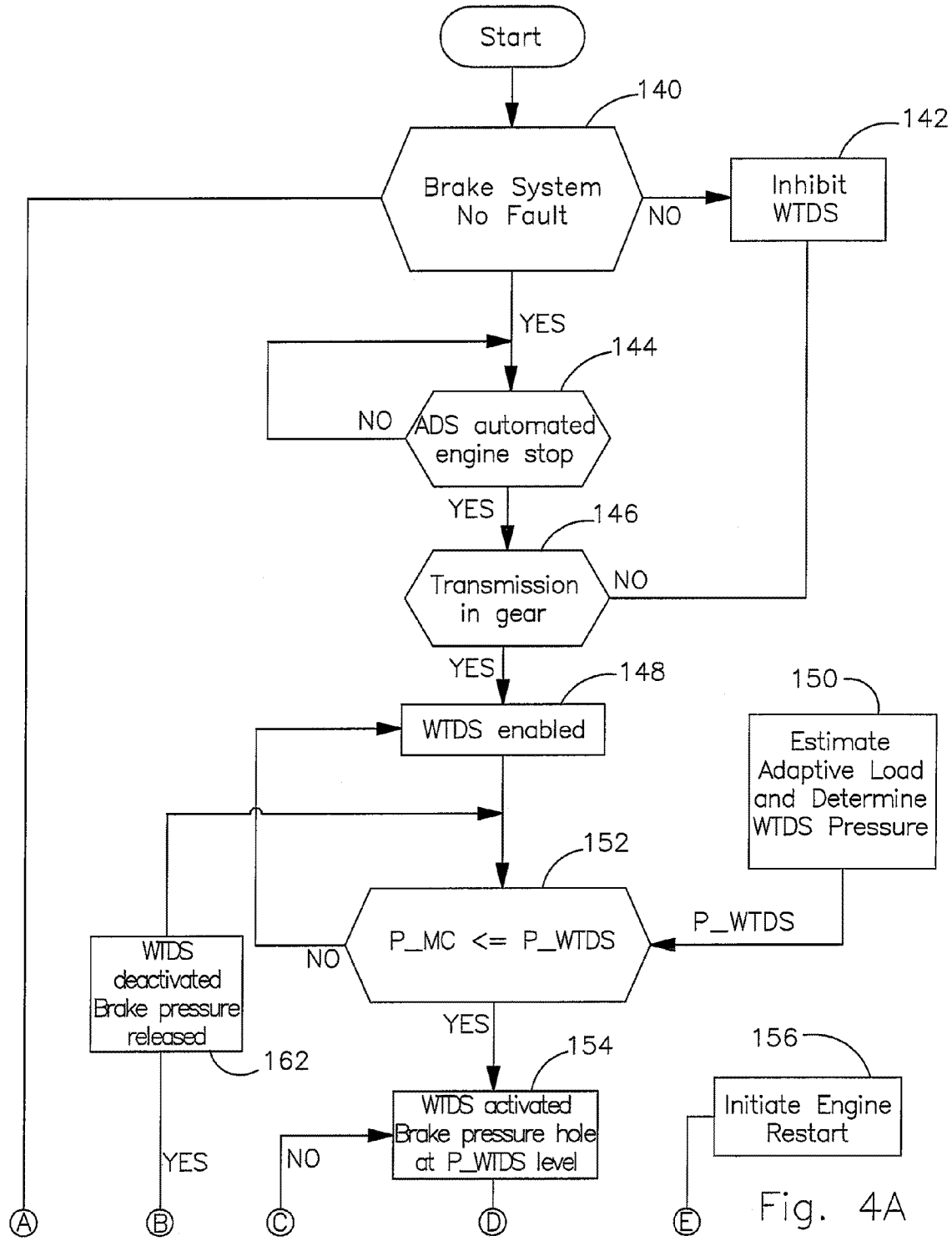
FIG. 4 illustrates a logic flow diagram of the steps of an algorithm for controlling the engine restart.
Figure 4B:
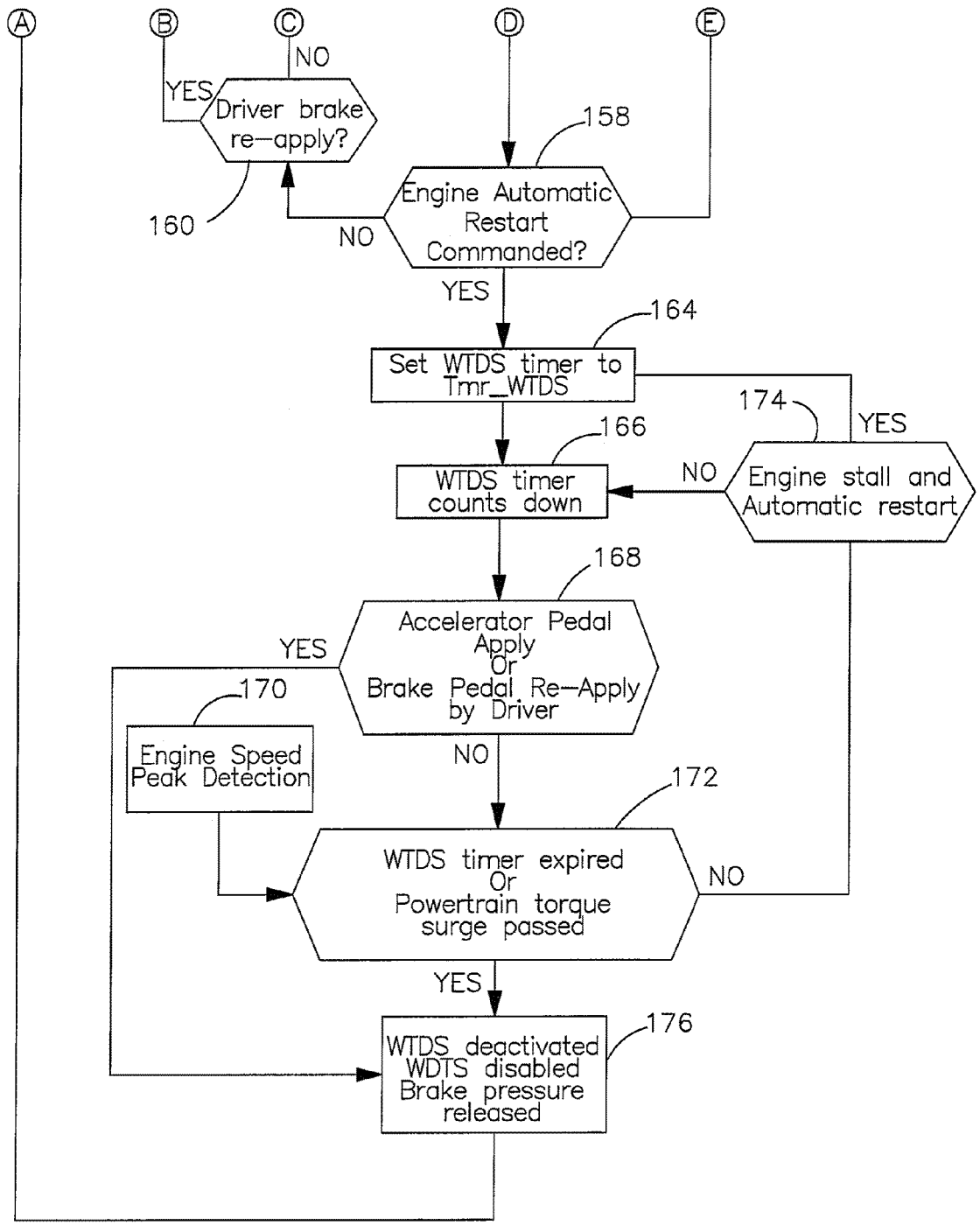

WTDS control is canceled whenever the accelerator pedal travel is over a certain distance or when the driver reapplies the brake pedal up to a certain level, thereby superseding WTDS control. Thereafter, the vehicle accelerated under creep torque or by a driver acceleration command FIG. 4 illustrates a logic flow diagram of the steps of algorithm 70 for controlling the engine restart. At step 140 a test is made to determine whether the brake system control 60 and engine stop-start control are enabled. If the result of test 140 is logically false, at step 142 the WTDS control is inhibited, i.e., turned off.

If the result of test 140 is logically true, at step 144 a test is made to determine whether an ADS automated engine stop has occurred. If the result of test 144 is logically false, control returns to step 144.

If the result of test 144 is true, at step 144 a test is made to determine whether transmission 16 is in gear. If the result of test 146 is false, control returns to step 142.

If the result of test 146 is true, at step 148 WTDS control is enabled.

At step 150 the adaptive load is estimated and WTDS pressure P_WTDS is determined.

At step 152 a test is made to determine whether the WTDS pressure adaptively determined brake pressure P_WTDS is equal to or greater than master cylinder pressure P_MC. If the result of test 152 is false, control returns to step 148.

If the result of test 152 is true, at step 154 WTDS control is activated and brake pressure is maintained at the P_WTDS magnitude.

At step 156 an engine restart may be initiated either by the vehicle operator or by the WTDS control.

At step 158 a test is made to determine whether an engine restart has been initiated. If the result of test 158 is false, at step 160 a test is made to determine whether the brake pedal 54 has been reapplied.

If the result of test 160 is false, control returns to step 154. If the result of test 160 is true, at step 162 WTDS control is deactivated, brake pressure is released, and control returns to step 152.

At step 164 the WTDS timer 100 is set to a reference period length and the countdown 106 occurs at step 166.

At step 168 a test is made to determine whether the accelerator pedal 52 has been applied or whether brake pedal 54 has been reapplied.

At step 170 engine speed is monitored to determine the occurrence of a peak in engine speed.

If the result of test 168 is false, at step 172 a test is made to determine whether the WTDS timer 100 has expired or whether a torque surge has ended as indicated by the occurrence of a peak in engine speed.

If the result of test 172 is false, at step 174 a test is made to determine whether an engine stall or automatic engine restart has occurred. If the result of test 174 is true, control returns to step 164. If the result of test 174 is false, true control returns to step 166.

At step 176 WTDS control is deactivated and disabled, brake pressure is released, and control returns to step 140.

The proposed brake pressure control does not exclude the case where individual brake circuit pressure or wheel chamber pressure will be used for control action determination rather than the brake master cylinder pressure.

In accordance with the provisions of the patent statutes, the preferred embodiment has been described. However, it should be noted that the alternate embodiments can be practiced otherwise than as specifically illustrated and described.

The invention claimed is:

1. A method for controlling an engine restart in a hybrid electric powertrain, comprising:
    (a) engaging a gear of a transmission driveably connected to the engine;
    (b) maintaining fluid pressure in a wheel brake after a brake pedal is released;
    (c) initiating the engine restart and starting a timer;
    (d) reducing fluid pressure in the wheel brake if the timer expires or a peak in engine speed following said restart is detected; wherein step (d) further comprises: monitoring engine speed to determine that a peak in engine speed has occurred; and reducing fluid pressure in the wheel brake after the peak in engine speed occurs.

2. The method of claim 1, wherein step (b) further comprises:
    determining a predetermined brake pressure;
    determining an adaptive brake pressure by adding to the predetermined brake pressure an adaptive brake pressure correction that accounts for powertrain states, predicted residual powertrain wheel torque, road gradient load torque compensation, and tolerance compensation; and
    maintaining the adaptive brake pressure in the wheel brake.

3. The method of claim 1 further comprising releasing fluid pressure in the wheel brake to allow the engine to accelerate the vehicle in response to depressing an accelerator pedal.

4. The method of claim 1 further comprising:
    setting the timer to a predetermined period length at the beginning of step (c);
    reducing fluid pressure in the wheel brake if the period expires before the engine restarts.

5. The method of claim 1 further comprising:
    setting the timer to a predetermined period length at the beginning of step (c); and
    reducing fluid pressure in the wheel brake if the engine restarts before the period expires.

6. The method of claim 1 wherein step (d) further comprises:
    using one of an engine speed peak, a sensor, and an estimation based engine torque as indicative of an occurrence of a powertrain torque spike, and
    reducing fluid pressure in the wheel brake after the powertrain torque spike occurs.

7. The method of claim 1 wherein step (d) further comprises:
    reducing fluid pressure in the wheel brake after the peak in engine speed occurs, or if engine speed is higher than a reference speed for a predetermined period.

8. The method of claim 1 further comprising:
    maintaining wheel torque substantially constant using negative brake torque at a vehicle wheel to at least partially suppress a spike in engine crankshaft torque transmitted to the wheel while the engine is restarting.

9. A method for controlling restart of an engine in a hybrid electric powertrain, comprising the steps of:
   (a) engaging a gear of a transmission connected to the engine;
   (b) determining a magnitude of pressure in vehicle wheel brakes that would at least partially suppress a spike in engine crankshaft torque transmitted to the wheel while the engine is restarting;
   (c) maintaining fluid pressure in a wheel brake after releasing a brake pedal;
   (d) initiating an engine restart and starting a timer;
   (e) reducing fluid pressure in the wheel brake if the timer expires or a peak in engine speed following the restart is detected; and
   (f) maintaining wheel torque substantially constant using reactive brake torque at vehicle wheels to at least partially cancel a spike in engine crankshaft torque transmitted to the wheels while the engine is restarting.

10. The method of claim 9 further comprising:
    releasing brake pressure;
    allowing the engine to accelerate the vehicle in response to depressing an accelerator pedal.

11. The method of claim 9 further comprising:
    releasing pressure in vehicle wheel brakes; and
    increasing pressure in vehicle wheel brakes in response to manual depression of the brake pedal.

12. The method of claim 9 further comprising:
    setting the timer to a predetermined period length at the beginning of step (d);
    reducing fluid pressure in the wheel brakes if the period expires before the engine restarts.

13. The method of claim 9 further comprising:
    setting the timer to a predetermined period length at the beginning of step (d);
    reducing fluid pressure in the wheel brakes if the engine restarts before the period expires.

14. The method of claim 9 wherein step (e) further comprises:
    monitoring engine speed to determine that the peak in engine speed has occurred after executing step (d); and
    reducing fluid pressure in the wheel brakes after the peak in engine speed occurs.

15. The method of claim 9 wherein step (e) further comprises:
    monitoring engine speed to determine that the peak in engine speed has occurred; and
    reducing fluid pressure in the wheel brake after the peak in engine speed occurs, or if engine speed is higher than a reference speed for a predetermined period.

16. A system for controlling restart of an engine in a hybrid electric powertrain, comprising:
    a transmission engaged in a gear and connected to the engine;
    a brake pedal;
    a timer;
    a controller configured to maintain predetermined pressure in a wheel brake, initiate the engine restart after the brake pedal is released, and reduce pressure in the wheel brake if the timer expires or a peak in engine speed following the restart is detected.

17. A system of claim 16, wherein:
    the controller is further configured to set the timer to a predetermined period length upon initiating the engine restart, and to reduce fluid pressure in the wheel brake if the period expires before the engine restarts.

18. A method for controlling an engine restart in a hybrid electric powertrain, comprising:
    (a) engaging a gear of a transmission driveably connected to the engine;
    (b) maintaining fluid pressure in a wheel brake after a brake pedal is released;
    (c) initiating the engine restart and starting a timer;
    (d) reducing fluid pressure in the wheel brake if the timer expires or a peak in engine speed following said restart is detected;
    wherein step (b) further comprises: determining a predetermined brake pressure; determining an adaptive brake pressure by adding to the predetermined brake pressure an adaptive brake pressure correction that accounts for powertrain states, predicted residual powertrain wheel torque, road gradient load torque compensation, and tolerance compensation; and maintaining the adaptive brake pressure in the wheel brake.

19. A method for controlling an engine restart in a hybrid electric powertrain, comprising:
    (a) engaging a gear of a transmission driveably connected to the engine;
    (b) maintaining fluid pressure in a wheel brake after a brake pedal is released;
    (c) initiating the engine restart and starting a timer;
    (d) reducing fluid pressure in the wheel brake if the timer expires or a peak in engine speed following said restart is detected; and
    (e) maintaining wheel torque substantially constant using negative brake torque at a vehicle wheel to at least partially suppress a spike in engine crankshaft torque transmitted to the wheel while the engine is restarting.

* * * * *